US 6,534,975 B2

(12) United States Patent
Beeck et al.

(10) Patent No.: US 6,534,975 B2
(45) Date of Patent: Mar. 18, 2003

(54) NONDESTRUCTIVE METHOD FOR DETERMINING THE THICKNESS OF A METALLIC PROTECTIVE LAYER ON A METALLIC BASE MATERIAL VIA A DIFFERENT TYPE OF LAYER BETWEEN THE METALLIC PROTECTIVE LAYER AND THE METALLIC BASE MATERIAL

(75) Inventors: Alexander Beeck, Kuessaberg (DE); Andreas Boegli, Wettingen (CH); John Fernihough, Ennetbaden (CH); Klaus Schneider, Kuessaberg (DE)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/754,188

(22) Filed: Jan. 5, 2001

(65) Prior Publication Data
US 2001/0009368 A1 Jul. 26, 2001

(30) Foreign Application Priority Data
Jan. 15, 2000 (DE) .......................... 100 01 516

(51) Int. Cl.[7] ................................. G01B 7/06
(52) U.S. Cl. ............................ 324/230; 324/229; 374/7
(58) Field of Search .................. 324/230, 229, 324/228, 231, 233, 236; 374/4–7, 126; 250/330, 332, 559.27; 73/627, 597, 598

(56) References Cited

U.S. PATENT DOCUMENTS

| | | | | |
|---|---|---|---|---|
| 3,815,016 A | * | 6/1974 | Nix et al. ................... | 324/202 |
| 4,634,291 A | | 1/1987 | Bantel et al. | |
| 4,818,118 A | | 4/1989 | Bantel et al. | |
| 4,920,319 A | | 4/1990 | Viertl | |
| 5,416,411 A | * | 5/1995 | Elsmore ..................... | 324/202 |
| 5,467,014 A | * | 11/1995 | Nix ............................ | 324/230 |
| 6,040,694 A | * | 3/2000 | Becker ....................... | 324/230 |

FOREIGN PATENT DOCUMENTS

| | | | |
|---|---|---|---|
| DE | 4215664 C1 | 11/1993 | |
| DE | 4443440 A1 | 7/1995 | |
| DE | 19609690 A1 | 10/1997 | |
| DE | 19814613 A1 | 10/1998 | |
| EP | 0139396 | 5/1985 | |
| EP | 0247582 B1 | 12/1987 | |
| GB | 2 152 675 A | 8/1985 | |
| GB | 2 306 648 A | 5/1997 | |
| JP | 0109801 | * 6/1983 | ................. 324/230 |
| SU | 1260670 | * 9/1986 | ................. 324/230 |
| WO | 95/01550 | 1/1995 | |
| WO | 97/34076 | 9/1997 | |

OTHER PUBLICATIONS

T.D.T. Latter; Measuring the thickness of protective coating by eddy currents; Jul. 1972; British Journal of NDT.*
C. Brook; Eddy Current measurement of coatings; Nov. 1975; British Journal of NDT.*
Eugene A. Hanysz; Swept frequency eddy–current device to measure overlay thickness; May 1958.*
United Kingdom Search Report dated Sep. 28, 2001, Application No. GB0100733.1.

* cited by examiner

Primary Examiner—Jay Patidar
(74) Attorney, Agent, or Firm—Burns, Doane, Swecker & Mathis, L.L.P.

(57) ABSTRACT

A nondestructive method for determining the thickness of a metallic protective layer determined by detection of a different type of intervening layer which is situated between the metallic protective layer and the metallic base material, by ultrasound, eddy-current or (pulsed) thermography. The intervening layer may comprise a nonmetallic layer of oxides or carbides, a metallic layer of pure nickel or a layer with depleted Al and Ti content in that region of the base material which is close to the surface. This method can be used for turbine blades in order to determine the layer thickness, for example during the test phase of coating, and to avoid the known destruction of the turbine blade, which is labor- and cost-intensive.

13 Claims, 1 Drawing Sheet

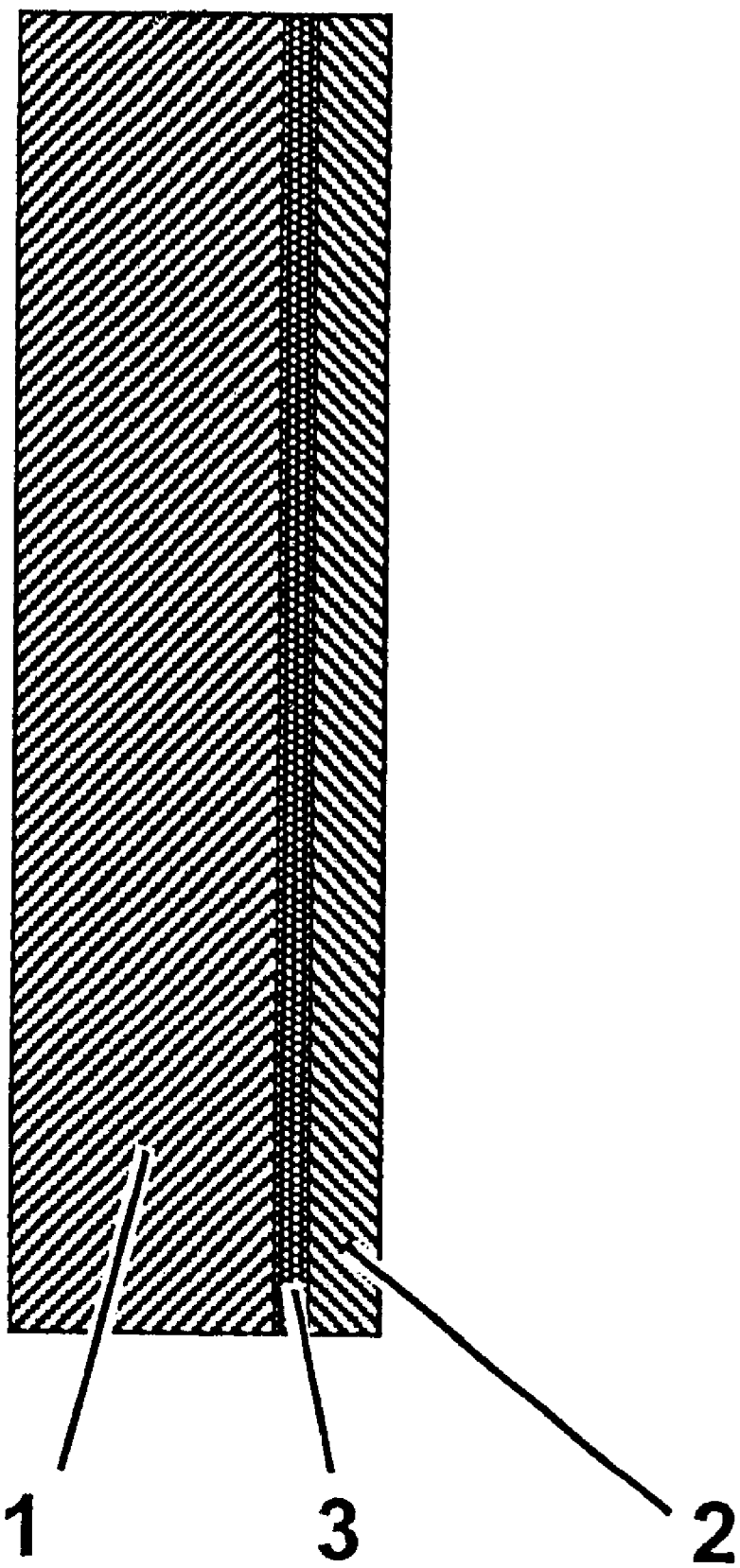
1      3                2

NONDESTRUCTIVE METHOD FOR DETERMINING THE THICKNESS OF A METALLIC PROTECTIVE LAYER ON A METALLIC BASE MATERIAL VIA A DIFFERENT TYPE OF LAYER BETWEEN THE METALLIC PROTECTIVE LAYER AND THE METALLIC BASE MATERIAL

This application claims priority under 35 U.S.C. §§ 119 and/or 365 to Appln. No. 100 01 516.6 filed in Germany on Jan. 15, 2000; the entire content of which is hereby incorporated by reference.

FIELD OF THE INVENTION

The invention relates to a nondestructive method for determining the thickness of a metallic protective layer on a metallic base material.

BACKGROUND OF THE INVENTION

It is known for highly stressed turbine blades, for example guide vanes and rotor blades, or combustion-chamber parts of a gas turbine to be provided with a protective layer, in order to obtain optimum protection for the gas-turbine part against mechanical and thermal effects or against oxidation while the turbine is operating. Turbine blades which consist of a nickel-base superalloy are in widespread use in the prior art, although alloys based on a different metal are equally conceivable. An example of a known metallic protective layer is MCrAlY. M stands for the metals Cr, Ni or Fe. Various coating processes for applying a protective layer of MCrAlY are known from the prior art. For example, plasma spraying processes are described in U.S. Pat. No. 4,152,223 or U.S. Pat. No. 4,246,326, although an electrical or chemical vapor deposition process is also possible. Other equivalent processes are also conceivable. However, before commissioning and at regular maintenance work carried out on a coating installation, it is necessary to set process parameters for these application processes so that a certain protective layer thickness on the gas-turbine component can be ensured. For this purpose, in the prior art it is known for the layer thickness of an applied protective layer, during the test phase of a coating process and for monitoring purposes during general operation, to be determined by destruction of the gas-turbine component, i.e. for the gas-turbine component to be cut open and analyzed in the laboratory (chemical etching, etc.). Hitherto, the similarity between the metallic base material and the metallic protective layer meant that it was impossible to use nondestructive measurement methods. Laboratory work is in general terms very time-consuming and also labor-intensive, which in itself represents a first drawback, and secondly the gas-turbine component has to be cut open and can then no longer be used, which represents a further drawback.

SUMMARY OF THE INVENTION

The invention seeks to remedy these problems. An object of the invention is to provide a nondestructive method for measuring the thickness of a metallic protective layer on a metallic base material. This should advantageously be a gas-turbine component which can be used further after the measurement and does not have to be discarded.

According to the invention, the object is achieved by the fact that the thickness of the metallic protective layer is determined by detection of a different type of layer which is situated between the metallic protective layer and the metallic base material.

In one embodiment, the intermediate layer may advantageously be a nonmetallic layer, i.e., for example, oxide particles or carbides, which can be produced simply by sandblasting. In a further embodiment, the intermediate layer is a metallic layer, for example of pure nickel. It is also possible to create a layer with depleted Al and Ti content in that region of the base material which is close to the surface before the metallic protective layer is applied. Both these embodiments have the advantage that the gas-turbine component can be used further following the determination, since during operation the nickel diffuses into the base material of the component and the protective layer or the elements Al and Ti are replaced again by diffusion from base material and protective layer. This may also take place in the course of the downstream diffusion heat treatment. To improve detectability, it is also possible for the base material to be additionally irradiated.

Advantageously, with the present invention it is possible to use methods which are known from the prior art, such as ultrasound, (pulsed) thermography or an eddy-current technique for measuring the layer thickness, since the layer located between the two metallic materials provides a sufficiently great contrast for a measurement to take place, thus allowing nondestructive measurement.

BRIEF DESCRIPTION OF THE DRAWINGS

Preferred embodiments of the invention are disclosed in the following description and illustrated in the accompanying drawings, in which:

The only FIGURE shows an embodiment according to the invention of a metallic base material having a metallic protective layer and a different type of layer or a layer consisting of foreign particles situated between them.

DETAILED DESCRIPTION OF THE INVENTION

The invention relates to a nondestructive method for determining the thickness of a metallic protective layer 2 on a metallic base material 1. This is illustrated in the only figure. The base material 1 may, for example, be a turbine blade or a different component of a gas turbine, which has to be provided with a metallic protective layer 2 on account of the thermal or mechanical loads to which it is exposed. Turbine blades are produced, for example, from a nickel-base superalloy, and MCrAlY is generally known from the prior art as a metallic protective layer.

According to the invention, a different type of layer or foreign particles 3 is applied between the metallic base material 1 and the metallic protective layer 2 in order to achieve detectability for the measurement method which is to be used to measure the layer thickness. Numerous nondestructive measurement methods are known from the prior art. Ultrasound, (pulsed) thermography or an eddy-current method can be used to measure the layer thickness according to the present invention.

It is possible to use or produce a different type of layer 3 or a layer 3 consisting of foreign particles in the following way:

1. The layer may be a layer of nonmetallic foreign particles, i.e., for example, of oxide particles. In this case, at least sufficient particles to allow detection for the selected measurement method have to be applied between the metallic base material 1 and the metallic protective layer 2. It is conceivable for the layer of oxides to be produced by prior oxidation or by sandblasting. In the case of sandblasting, a defined layer of blasting particles continues to adhere to the surface. The distribution of the particles and the roughness of the intermediate layer may be set according to the requirements of the measurement technique. This type of oxide layers, which can be produced very easily, allows simple and rapid checking of the thickness of the metallic protective layer 2, and the destructive cutting and assessment of the protective layer thickness in the laboratory, which previously represented a time-consuming, cost-intensive procedure, is dispensed with.

As another nonmetallic foreign layer, it is also conceivable to use a layer of carbides, which provides a very good signal in the case of thermography measurement.

2. Since the component produced in the test method using nonmetallic foreign particles, such as oxides or carbides, cannot then be utilized further and put into operation, but rather the component has to be discarded, it is also conceivable to apply a layer which is not disruptive to the metallic base material 1 and the metallic protective layer 2 and allows the coated component to the used further after the measurement. A layer of pure nickel could be used for this purpose. The layer, which may preferably be produced using a process which is known from the prior art, i.e., for example, CVD (chemical vapor deposition) or by electrolytic application, has the advantage that it diffuses into the base material 1 and the protective layer 2 during the diffusion heat treatment or while the component is operating, and consequently the components can be used further. A layer thickness of 5–50 $\mu$m is advantageous.

3. The different type of layer 3 can also be achieved by depleting the content of the elements Al or Ti of a region of the base material 1 which is close to the surface, over a depth of 10–50 $\mu$m. A depleted layer 3 of this type is easy to produce using methods which are known from the prior art. For example, an FIC (Fluoride Ion Gas Cleaning) process is generally known. Pulsed thermography is particularly suitable for detection of the depleted layer 3. Such measurements can be carried out in a frequency range of greater than 16 KHz. This embodiment has the advantage that the Al- and Ti-depleted layer 3 is filled up again by diffusion from the metallic protective layer 2 and the metallic base material 1 during the routine diffusion heat treatment which follows the coating operation.

The foreign particle layers 3 mentioned under points 2 and 3, optionally of nickel or with a depleted Al and Ti content, can be used not only to check turbine blades for test purposes but also, in a simple way, in principle to check all turbine blades produced during the standard production process.

What is claimed is:

1. A method for providing a measuring reference for measuring a thickness of a metallic protective layer on a turbine component, comprising:

providing a different type of layer between the metallic protective layer and a metallic base material of the turbine component; and determining with a non-destructive measurement technique the thickness of the protective layer by using the different electrical or magnetic or thermal conducting or sound conducting properties of the different type of layer between the protective layer and the metallic base material.

2. The method of claim 1, wherein the different type of layer comprises non-metallic particles.

3. The method of claim 1, wherein the different type of layer comprises at least one of a carbide and an oxide.

4. The method of claim 1, wherein the different type of layer comprises a layer of nickel.

5. The method of claim 4, wherein the layer of nickel has a thickness of 5–50 micrometers.

6. The method of claim 1, comprising:

forming the different type of layer by reducing an Al and Ti content of the metallic base material of the turbine component within the top 10 to 50 micrometers of the metallic base material; and then applying the metallic protective layer.

7. The method of claim 1, wherein the metallic protective layer is made from MCrAlY.

8. The method of claim 7, wherein the metallic base material of the turbine component consists of a nickel-base superalloy.

9. The method of claim 1, wherein the turbine component comprises a turbine blade.

10. The method of claim 1, wherein the step of determining comprises determining the thickness of the protective layer by comparing a) data obtained by applying the non-destructive measurement technique to the turbine component, with b) known reference values.

11. The method of claim 1, wherein the non-destructive measurement technique comprises a thermography technique.

12. The method of claim 1, wherein the non-destructive measurement technique comprises an ultrasound technique.

13. The method of claim 1, wherein the non-destructive measurement technique comprises an eddy-current measurement technique.

* * * * *